US007647985B2

(12) United States Patent
Furusawa et al.

(10) Patent No.: US 7,647,985 B2
(45) Date of Patent: Jan. 19, 2010

(54) HAMMER DRILL

(75) Inventors: Masanori Furusawa, Anjo (JP); Yoshihiro Kasuya, Anjo (JP)

(73) Assignee: Makita Corporation, Anjo (JP)

( * ) Notice: Subject to any disclaimer, the term of this patent is extended or adjusted under 35 U.S.C. 154(b) by 67 days.

(21) Appl. No.: 12/010,167

(22) Filed: Jan. 22, 2008

(65) Prior Publication Data

US 2008/0245542 A1 Oct. 9, 2008

(30) Foreign Application Priority Data

Jan. 26, 2007 (JP) ............................ 2007-016809

(51) Int. Cl.
*B23B 45/16* (2006.01)

(52) U.S. Cl. ............................ 173/48; 173/47; 173/90; 173/92; 173/93.7; 173/117; 173/122

(58) Field of Classification Search .................. 173/48, 173/47, 90, 92, 93.7, 117, 122
See application file for complete search history.

(56) References Cited

U.S. PATENT DOCUMENTS 3,685,594 A * 8/1972 Koehler ....................... 173/48
4,204,580 A * 5/1980 Nalley ......................... 173/48
4,223,744 A * 9/1980 Lovingood ................... 173/48
4,763,733 A * 8/1988 Neumaier .................... 173/48
5,458,206 A * 10/1995 Bourner et al. ............. 173/178
5,842,527 A * 12/1998 Arakawa et al. .............. 173/48
6,176,321 B1 * 1/2001 Arakawa et al. .............. 173/48
6,192,996 B1 * 2/2001 Sakaguchi et al. ............ 173/48
6,557,648 B2 5/2003 Ichijyou et al.
6,913,090 B2 * 7/2005 Droste et al. ................ 173/109
7,303,026 B2 * 12/2007 Frauhammer et al. ......... 173/48
7,404,781 B2 * 7/2008 Milbourne et al. .......... 475/298
2004/0211576 A1 * 10/2004 Milbourne et al. ............ 173/48
2005/0199404 A1 * 9/2005 Furuta et al. .................. 173/48
2005/0269116 A1 12/2005 Frauhammer et al.
2006/0021771 A1 * 2/2006 Milbourne et al. .......... 173/176
2006/0185866 A1 * 8/2006 Jung et al. .................... 173/48

FOREIGN PATENT DOCUMENTS

DE 10 2004 055 236 A1 5/2006
JP A 2002-192481 7/2002
JP A-2006-512216 4/2006

* cited by examiner

*Primary Examiner*—Brian D Nash
(74) *Attorney, Agent, or Firm*—Oliff & Berridge, PLC

(57) ABSTRACT

It is an object of the invention to provide an improvement in ease of operation of a driving mode switching mechanism in a hammer drill. According to the invention, a representative hammer drill includes a driving mode switching mechanism which has an operating part, a first switching member and a second switching member. The operating part can be turned to at least three rotating positions in its circumferential direction, while the operating part can be turned 360° on the rotation axis in the both directions. Thus, the user can select the desired driving mode in the shortest turning distance without passing though an unnecessary driving mode position. Therefore, ease of operation in mode change can be enhanced.

6 Claims, 9 Drawing Sheets

(A)

(B)

HAMMER DRILL

BACKGROUND OF THE INVENTION

1. Field of the Invention

The present invention relates to a hammer drill having a driving mode switching mechanism that switches the driving mode of a tool bit among a hammer mode in which the tool bit is caused to perform striking movement in its longitudinal direction, a drill mode in which the tool bit is caused to perform rotation on its axis and a hammer drill mode in which the tool bit is caused to perform striking movement and rotation.

2. Description of the Related Art

Japanese laid-open patent publication No. 2002-192481 discloses a hammer drill having a driving mode switching mechanism that switches among three modes as described above. The known hammer drill has a mode-change switching lever that is turned on a predetermined rotation axis by a user. When the switching lever is turned, a clutch of a striking force transmitting mechanism is switched between a power transmission state and a power transmission interrupted state via a first switching member that is activated by a first eccentric pin provided in the switching lever. Further, a clutch of a rotating force transmitting mechanism is switched between a power transmission state and a power transmission interrupted state via a second switching member that is activated by a second eccentric pin of the switching lever. With such a construction, a mechanism for switching the clutch for the striking movement and a mechanism for switching the clutch for rotation, which are activated by turning the switching lever, interfere with each other when the switching lever is turned over 180°. Therefore, with reference to a position for the hammer drill mode, the hammer mode is selected when the switching lever is turned clockwise by a predetermined angle. Further, when the switching lever is turned counterclockwise by a predetermined angle, the drill mode is selected.

However, with this known driving mode switching mechanism, mode change is performed by turning the switching lever in either direction with reference to the hammer drill mode position. Therefore, the hammer drill mode position is inevitably located between the hammer mode position and the drill mode position. In order to switch from the hammer mode to the drill mode or from the drill mode to the hammer mode, the switching lever must be turned through the hammer drill mode position and over 180°. Therefore, the known driving mode switching mechanism is desired to be further improved in ease of switching operation.

SUMMARY OF THE INVENTION

Accordingly, it is an object of the invention to provide a technique that contributes to improvement in ease of operation of a driving mode switching mechanism in a hammer drill.

In order to solve the above-described problem, a representative hammer drill according to the present invention includes a tool bit, a first driving mechanism part that linearly drives the tool bit in its longitudinal direction, a first clutch mechanism that is disposed in the first driving mechanism part and can be switched between a power transmission state of transmitting a driving force and a power transmission interrupted state of interrupting the transmission of the driving force, a second driving mechanism part that rotationally drives the tool bit on its axis, a second clutch mechanism that is disposed in the second driving mechanism part and can be switched between a power transmission state of transmitting a driving force and a power transmission interrupted state of interrupting the transmission of the driving force, and a driving mode switching mechanism. The driving mode switching mechanism switches the driving mode of the tool bit among a hammer mode in which the tool bit is caused to perform striking movement in the longitudinal direction, a drill mode in which the tool bit is caused to perform rotation on its axis and a hammer drill mode in which the tool bit is cause to perform striking movement and rotation.

The driving mode switching mechanism according to the present invention includes an operating part that can be turned on a predetermined rotation axis by a user, a first switching member that is activated by turning the operating part and switches the state of the first clutch mechanism, and a second switching member that is activated by turning the operating part and switches the state of the second clutch mechanism.

The operating part can be turned to at least three rotating positions in its circumferential direction. When the operating part is turned to the first rotating position in the circumferential direction, the first clutch mechanism is switched to the power transmission state by the first switching member and the second clutch mechanism is switched to the power transmission interrupted state by the second switching member. As a result, the hammer mode is selected as the driving mode of the tool bit. Further, when the operating part is turned to the second rotating position in the circumferential direction, the first clutch mechanism is switched to the power transmission interrupted state by the first switching member and the second clutch mechanism is switched to the power transmission state by the second switching member. As a result, the drill mode is selected as the driving mode of the tool bit. Further, when the operating part is turned to the third rotating position in the circumferential direction, the first clutch mechanism is switched to the power transmission state by the first switching member and the second clutch mechanism is switched to the power transmission state by the second switching member. As a result, the hammer drill mode is selected as the driving mode of the tool bit.

The operating part of the driving mode switching mechanism according to the present invention can be turned 360° on the rotation axis in the both directions. According to the present invention, with this construction, when the user switches the driving mode among the hammer mode, the drill mode and the hammer drill mode, the user can promptly select a desired driving mode by turning the operating part clockwise or counterclockwise toward a desired rotating position for the desired driving mode. Thus, the user can select the desired driving mode in the shortest turning distance without passing through an unnecessary driving mode position. Therefore, ease of operation in mode change can be enhanced.

In another aspect of the present invention, in addition to said modes, the driving modes which can be selected by the user include a neutral mode in which the user can manually rotate the tool bit. The manner in which the "user can rotate" the tool bit according to this invention represents the manner in which the user holds the tip end of the tool bit by the fingers and can rotate it in the circumferential direction. Further, the fourth and fifth rotating positions for the neutral mode are set between the first and second rotating positions and between the first and third rotating positions, respectively. When the operating part is turned to the fourth or fifth rotating position, the second clutch mechanism is switched to the power transmission interrupted state by the second switching member.

Typically, a hammer drill is configured such that the tool bit is locked against rotation in the circumferential direction so as to be prevented from unnecessarily rotating in the circumferential direction during operation in the hammer mode. Such mechanism is defined as "variolock". Therefore, in order to change the driving mode of the tool bit to the hammer mode, the user adjusts the orientation of the tip end of the tool bit prior to the above-described variolock. Specifically, the user turn the driving mode to the neutral mode and in this state holds the tool bit and adjusts the orientation of the tip end of the tool bit. Thereafter, the user changes the driving mode from the neutral mode to the hammer mode. According to the invention, in the both cases of switching from the drill mode to the hammer mode and switching from the hammer drill mode to the hammer mode, the operating part is turned to the hammer mode position via the neutral mode position in the shortest distance. Therefore, the switching action by the operating part can be efficiently performed.

As one aspect of the invention, the first rotating position for the hammer mode, the second rotating position for the drill mode and the third rotating position for the hammer drill mode may preferably be set at even intervals in the circumferential direction of the rotation axis. With this construction, in any of the cases of switching to any rotating position, the operating part can be turned by the same distance. Thus, the ease of use can be enhanced.

Further, as one aspect of the invention, the representative hammer drill may preferably include a rotating member that is rotated on a rotation axis different from the rotation axis of the operating part in synchronization with rotation of the operating part when the operating part is turned. In this connection, the first switching member may include a first eccentric pin that is disposed in a position displaced from the rotation axis of the rotating member and switches the state of the first clutch mechanism by linear components of eccentric revolution on the rotation axis of the rotating member when the rotating member rotates. Further, the operating part may have a second eccentric pin disposed in a position displaced from the rotation axis of the operating part, the second switching member comprises a movable member disposed in such a manner as to be linearly movable, and the movable member is caused to linearly move by linear components of the second eccentric pin which eccentrically revolves on the rotation axis of the operating part and thereby switches the state of the second clutch member when the operating part is turned.

With such construction, mutual mechanical interference relating to the switching mechanism between the first clutch mechanism and the second clutch mechanism can be avoided. Therefore, the operating part can be turned 360°.

As another aspect of the invention, the representative power tool may preferably include a tool body that houses the first driving mechanism part, the second driving mechanism part, the first clutch mechanism, and the second clutch mechanism, wherein the operating part is disposed on the upper surface of the tool body.

With such construction, compared with the construction in which the operating part is disposed on the side surface of the tool body, the mode switching operation of the operating part can be easily performed by the user, whether right-handed or left-handed. Thus, the ease of use can be enhanced.

The first rotating position of the operating part may preferably be placed in the front of the path of rotation of the operating part in the longitudinal direction of the power tool, and the second or third rotating position placed rearward of the first rotating position can be selected by selectively turning the operating part clockwise or counterclockwise from the first rotating position.

With this construction, the mechanical mechanism for changing the state of the clutch mechanism by converting rotation of the operating member to linear motion in the longitudinal direction can be rationally provided.

As a result, a technique is provided which contributes to improvement in ease of operation of a driving mode switching mechanism in a hammer drill. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved hammer drills and method for using such hammer drills and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
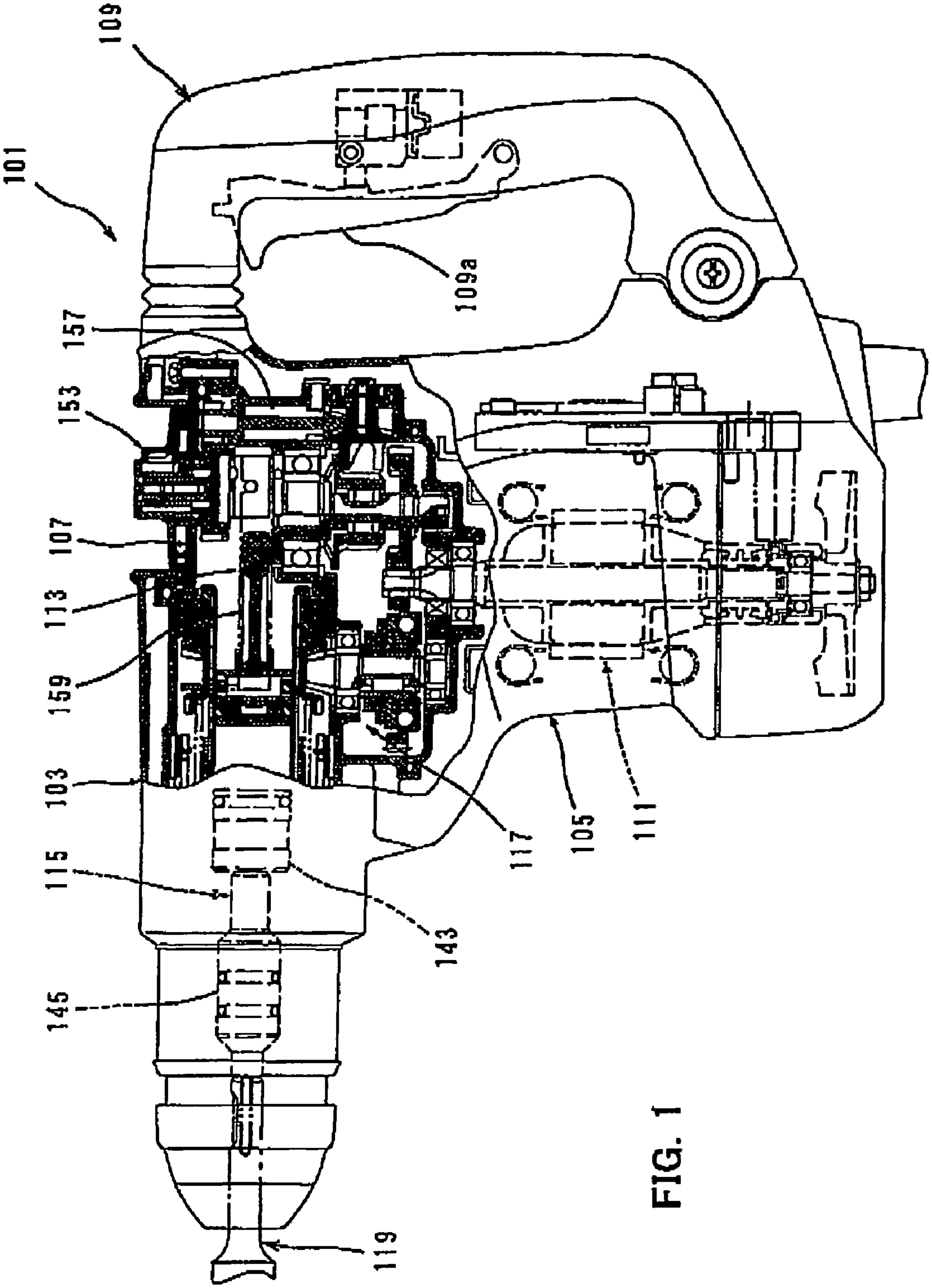
FIG. 1 is a sectional side view schematically showing an entire hammer drill according to an embodiment of the invention.

A representative embodiment of the present invention is described with reference to FIGS. 1 to 13. FIG. 1 is a sectional side view showing an entire electric hammer drill 101 according to the representative embodiment of the present invention. As shown in FIG. 1, the hammer drill 101 of this embodiment includes a body 103, a hammer bit 119 detachably coupled to the tip end region (on the left side as viewed in FIG. 1) of the body 103 via a hollow tool holder (not shown), and a handgrip 109 that is held by a user and connected to the body 103 on the side opposite to the hammer bit 119. The hammer bit 119 is held by the tool holder such that it is allowed to reciprocate with respect to the tool holder in its axial direction and prevented from rotating with respect to the tool holder in its circumferential direction. The body 103 comprises a "tool body". The hammer bit 119 is a feature that corresponds to the "tool bit" according to the present invention. In the present embodiment, for the sake of convenience of explanation, the side of the hammer bit 119 is taken as the front side and the side of the handgrip 109 as the rear side.

The body 103 includes a motor housing 105 that houses a driving motor 111, and a gear housing 107 that houses a motion converting mechanism 131, a striking element 115 and a power transmitting mechanism 117. The motion converting mechanism 113 is adapted to appropriately convert the rotating output of the driving motor 111 to linear motion and then to transmit it to the striking element 115. As a result, an impact force is generated in the axial direction of the hammer bit 119 via the striking element 115. Further, the speed of the rotating output of the driving motor 111 is appropriately reduced by the power transmitting mechanism 117 and then transmitted to the hammer bit 119. As a result, the hammer bit 119 is caused to rotate in the circumferential direction. The driving motor 111 is driven when a trigger 109*a* on the handgrip 109 is depressed. The motion converting mechanism 113 and the power transmitting mechanism 117 are features that correspond to the "first driving mechanism part" and the "second driving mechanism part", respectively, according to this invention.

FIGS. 2 to 5 show an essential part of the hammer drill 101 in enlarged sectional view. The motion converting mechanism 131 includes a driving gear 121 that is rotated in a horizontal plane by the driving motor 111, a driven gear 123, a crank shaft 122, a crank plate 125, a crank arm 127 and a driving element in the form of a piston 129. The crank shaft 122, the crank plate 125, the crank arm 127 and the piston 129 form a crank mechanism 114. The piston 129 is slidably disposed within the cylinder 141 and reciprocates along the cylinder 141 when the driving motor 111 is driven.

The crank shaft 122 is disposed such that its longitudinal direction is a vertical direction crossing the axial direction of the hammer bit 119. A clutch member 124 is disposed between the crank shaft 122 and the driven gear 123. The clutch member 124 forms a clutch mechanism in the motion converting mechanism 113 and is a feature that corresponds to the "first clutch mechanism". The clutch member 124 has a cylindrical shape and has a flange 124*b* extending outward from one axial end (upper end) of the clutch member 124. The clutch member 124 is mounted on the crank shaft 122 such that the clutch member 124 can move in the longitudinal direction with respect to the crank shaft 122 and rotate together in the circumferential direction. The clutch member 124 further has clutch teeth 124*a* on the outer periphery. The driven gear 123 has a circular recess and clutch teeth 123*a* are formed in the inner circumferential surface of the circular recess. The teeth 124*a* of the clutch member 124 are engaged with and disengaged from the clutch teeth 123*a* of the driven gear 123 when the clutch member 124 moves on the crank shaft 122 in the longitudinal direction. In other words, the clutch member 124 can be switched between a power transmission state (see FIGS. 2 and 3) in which the driving force of the driven gear 123 is transmitted to the crank shaft 122 and a power transmission interrupted state (see FIG. 4) in which such transmission of the driving force is interrupted. The clutch member 124 is normally biased by a biasing spring 126 in the direction of engagement between the clutch teeth 124*a* and the clutch teeth 123*a* of the driven gear 123. Switching of the operating state of the clutch member 124 is described below.

The striking element 115 includes a striker 143 and an impact bolt 145 (see FIG. 1). The striker 143 is slidably disposed within the bore of the cylinder 141. The impact bolt 145 is slidably disposed within the tool holder and serves as an intermediate element to transmit the kinetic energy of the striker 143 to the hammer bit 119. The striker 143 is driven via the action of an air spring of an air chamber 141*a* of the cylinder 141 which is caused by sliding movement of the piston 129. The striker 143 then collides with (strikes) the impact bolt 145 that is slidably disposed within the tool holder, and transmits the striking force to the hammer bit 119 via the impact bolt 145.

The power transmitting mechanism 117 includes an intermediate gear 132 that engages with the driving gear 121, an intermediate shaft 133 that rotates together with the intermediate gear 132, a small bevel gear 134 that is caused to rotate in a horizontal plane together with the intermediate shaft 133, a large bevel gear 135 that engages with the small bevel gear 134 and rotates in a vertical plane, and a slide sleeve 147 that engages with the large bevel gear 135 and is caused to rotate. The rotation driving force of the slide sleeve 147 is transmitted to the tool holder via the cylinder 141 which rotates together with the slide sleeve 147, and then further transmitted to the hammer bit 119 held by the tool holder. The slide sleeve 147 can move with respect to the cylinder 141 in the axial direction of the hammer bit and rotates together with the cylinder 141 in the circumferential direction.

The slide sleeve 147 forms a clutch mechanism in the power transmitting mechanism 117 and is a feature that corresponds to the "second clutch mechanism" according to this invention. Clutch teeth 147*a* are formed on the outer periphery of one longitudinal end portion of the slide sleeve 147 and engage with clutch teeth 135*a* of the large bevel gear 135 when the slide sleeve 147 moves rearward (toward the handgrip) with respect to the cylinder 141. Such engagement is released when the slide sleeve 147 moves forward (toward the hammer bit) with respect to the cylinder 141. In other words, the slide sleeve 147 can be switched between a power transmission state (see FIGS. 3 and 4) in which the rotation driving force of the large bevel gear 135 is transmitted to the cylinder 141 and a power transmission interrupted state (see FIGS. 2 and 5) in which such transmission of the driving force is interrupted. The slide sleeve 147 is normally biased by a biasing spring 148 in the direction of engagement between the clutch teeth 147*a* and the clutch teeth 135*a* of the large bevel gear 135. Switching of the operating state of the slide sleeve 147 is described below.

Further, rotation locking teeth 147*b* are formed on the other longitudinal end portion (front end portion) of the slide sleeve 147. When the slide sleeve 147 is caused to move forward and switched to the power transmission interrupted state (when the hammer bit 119 is driven in the hammer mode), the teeth 147*b* of the slide sleeve 147 engage with teeth 149*a* of a lock ring 149 that is locked in the circumferential direction with respect to the gear housing 107. As a result, the cylinder 141, the tool holder and the hammer bit 119 can be locked against free movement (rotation) in the circumferential direction ("variolock").

The motion converting mechanism 113 and the power transmitting mechanism 117 are housed within a crank chamber 151 or the inside space of the gear housing 107. Sliding areas of the mechanisms are lubricated by lubricant (grease) filled in the crank chamber 151.

A driving mode switching mechanism 153 for switching between driving modes of the hammer bit 119 is now explained with reference to FIGS. 2 to 13. The driving mode switching mechanism 153 can be switched among a hammer mode in which the hammer bit 119 is caused to perform only striking movement, a hammer drill mode in which the hammer bit 119 is caused to perform both the striking movement and rotation, a drill mode in which the hammer bit 119 is caused to perform only rotation, and a neutral mode in which the hammer bit 119 is held by the user and rotated.

As shown in FIGS. 2 to 5, the driving mode switching mechanism 153 mainly includes a mode switching member 155 that is operated by the user, a first switching mechanism 157 that switches the clutch member 124 of the crank mechanism 114 according to the switching operation of the mode switching member 155, and a second switching mechanism 159 that switches the slide sleeve 147 of the power transmitting mechanism 117. The mode switching member 155 is a feature that corresponds to the "operating part" according to this invention. The mode switching member 155 is mounted externally on the upper surface of the gear housing 107 (the upper side as viewed in FIG. 1). In other words, the mode switching member 155 is disposed above the crank mechanism 114.

As shown in FIGS. 6 to 9, the mode switching member 155 includes a disc 155*a* with an operating grip 155*b* and is mounted on the gear housing 107 such that it can be turned 360° on a rotation axis P (see FIGS. 2 to 5) in a horizontal plane. The hammer mode position, the hammer drill mode position and the drill mode position are marked on the gear housing 107 with marks 191*a*, 191*b*, 191*c* (shown by pictographs in FIGS. 6 to 9) at even intervals or 120° intervals in the circumferential direction. The mode switching member 155 can be switched to a desired mode position by placing the pointer of the operating grip 155*b* on any one of the marks 191*a*, 191*b*, 191*c*. The position of the mark 191*a* indicating the hammer mode, the position of the mark 191*b* indicating the drill mode and the position of the mark 191*c* indicating the hammer drill mode are features that correspond to the "first rotating position", the "second rotating position" and the "third rotating position", respectively, according to this invention.

Figure 6:
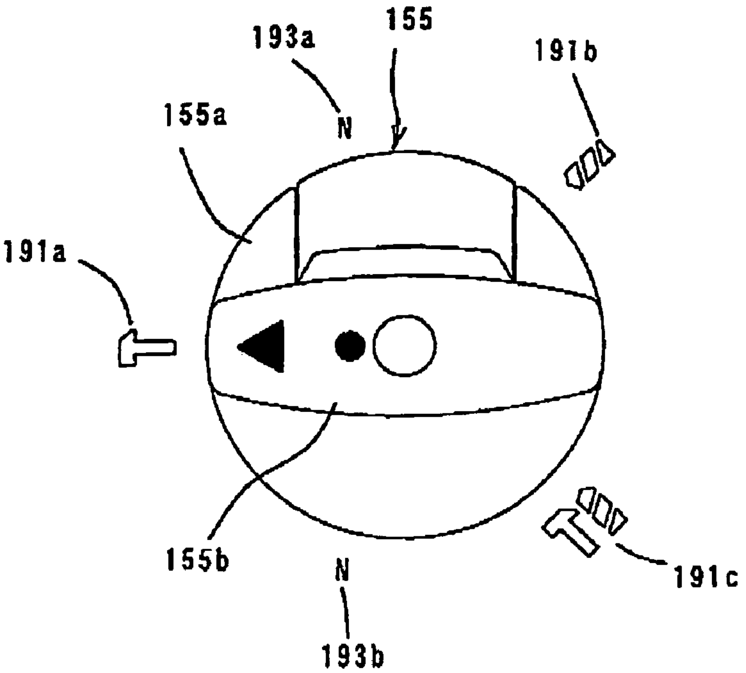
FIG. 6 is a plan view showing a mode switching member in hammer mode.
Figure 7:
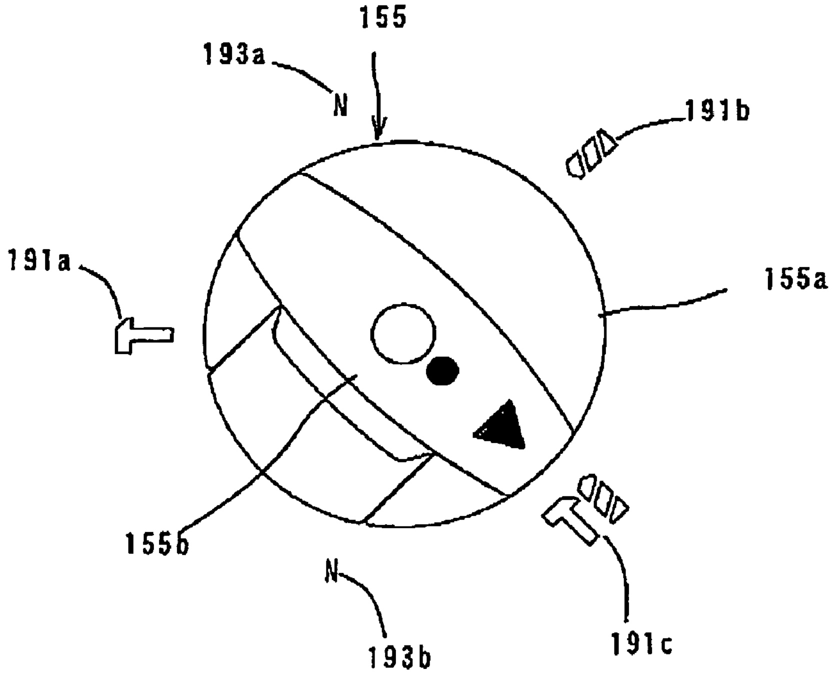
FIG. 7 is a plan view showing the mode switching member in hammer drill mode.
Figure 8:
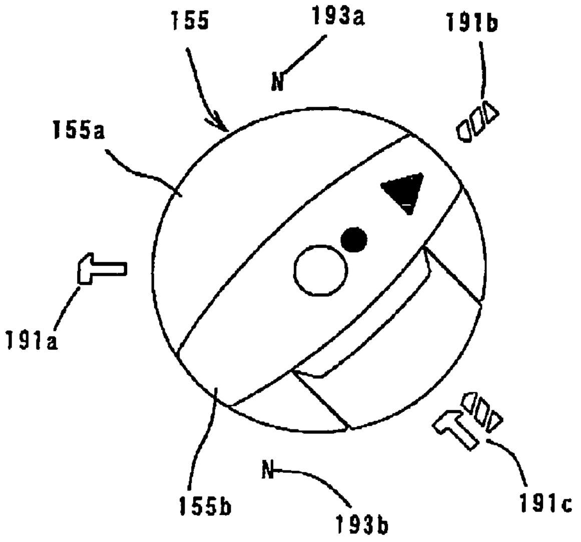
FIG. 8 is a plan view showing the mode switching member in drill mode.
Figure 9:
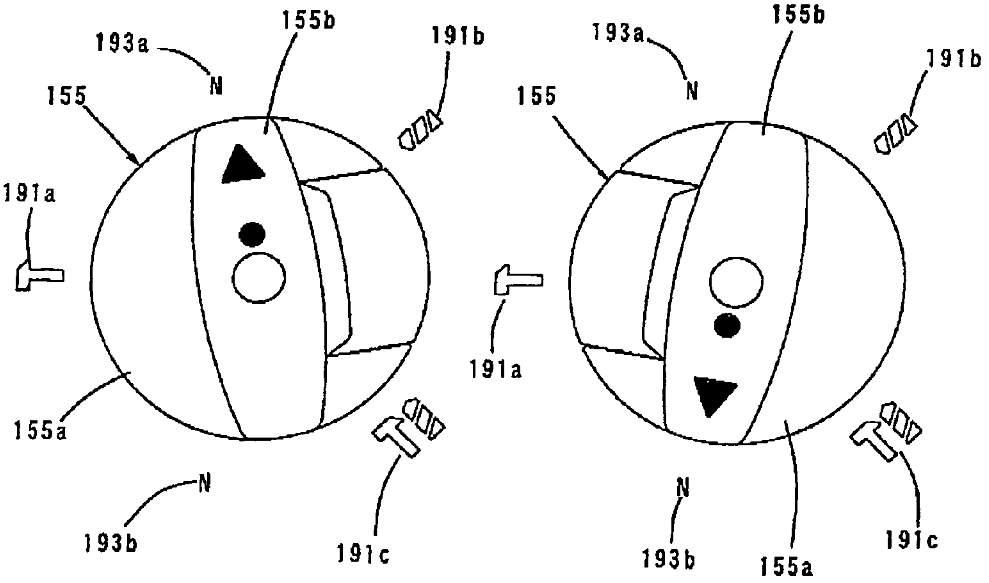
FIG. 9 is a plan view showing the mode switching member in neutral mode.

As shown in FIGS. 6 to 9, the neutral mode positions are marked with marks 193*a*, 193*b* (shown by symbol "N") generally at the midpoint between the mark 191*a* for the hammer mode position and the mark 191*b* for the drill mode position, and between the mark 191*a* for the hammer mode position and the mark 191*c* for the hammer drill mode position. The positions of the marks 193*a*, 193*b* for the neutral mode are features that correspond to the "fourth and fifth rotating positions" according to this invention. FIG. 6 shows the mode switching member 155 placed in the hammer mode position, FIG. 7 shows it in the hammer drill mode position, FIG. 8 shows it in the drill mode position, and FIG. 9 shows it in the neutral mode position.

The first switching mechanism 157 is constructed such that switching of the clutch member 124 of the crank mechanism 114 is effected by revolution (eccentric revolution) of a first eccentric pin 167 on the rotation axis of a rotating member 166 when the mode switching member 155 is turned for mode change. The first eccentric pin 167 is a feature that corresponds to the "first switching member" according to this invention. The first switching mechanism 157 mainly includes a first gear 161, a second gear 162, a rotation transmitting shaft 163, a third gear 164, a fourth gear 165, the rotating member 166 and the first eccentric pin 167.

The first gear 161 rotates in a horizontal plane together with the mode switching member 155 when the mode switching member 155 is turned in a horizontal plane on the rotation axis P. The second gear 162 engages with the first gear 161 and is integrally formed on one longitudinal end portion (upper end portion) of the rotation transmitting shaft 163. The rotation transmitting shaft 163 rotates on a rotation axis parallel to the rotation axis P of the mode switching member 155 and is disposed vertically such that its longitudinal direction is parallel to the longitudinal direction of the crank shaft 122. The third gear 164 is integrally formed on the other longitudinal end portion (lower end portion) of the rotation transmitting shaft 163 and engages with the fourth gear 165. The fourth gear 165 is integrally formed on the rotating member 166. The rotating member 166 is horizontally disposed below the rotation transmitting shaft 163 such that its longitudinal direction is perpendicular to the rotation transmitting shaft 163. Each of the third and fourth gears 164, 165 comprises a bevel gear and engages with the other.

Therefore, when the mode switching member 155 is turned for mode change, the rotation transmitting shaft 163 is caused to rotate in a horizontal plane via the first and second gears 161, 162. The rotation of the rotation transmitting shaft 163 is further transmitted as rotation in a vertical plane to the rotating member 166 via the third and fourth gears 164, 165. The first eccentric pin 167 is provided on the axial end surface of the rotating member 166 and disposed in a position displaced a predetermined distance from the rotation axis of the rotating member 166. The first eccentric pin 167 is disposed to face the underside of the flange 124*b* of the clutch member 124. Therefore, when the rotating member 166 is caused to rotate in a vertical plane and thus the first eccentric pin 167 eccentrically revolves on the rotation axis of the rotating member 166, the first eccentric pin 167 vertically moves the clutch member 124 along the crank shaft 122 while engaging with the flange 124*b* of the clutch member 124 by its vertical components (components in the longitudinal direction of the crank shaft 122) of the revolving movement. In this manner, the first eccentric pin 167 moves the clutch member 124 between the power transmission position and the power transmission interrupted position. The first gear 161, the second gear 162, the rotation transmitting shaft 163, the third gear 164 and the fourth gear 165 form a switching operation transmitting mechanism 169.

The first and second gears 161, 162 of the first switching mechanism 157 are disposed within the crank chamber 151, while the rotation transmitting shaft 163, the third gear 164, the fourth gear 165 and the rotating member 166 of the first switching mechanism 157 are disposed outside the crank chamber 151, or within a housing space 152 provided within the gear housing 107. The housing space 152 communicates with the crank chamber 151 via a circular opening 168. The rotating member 166 is disposed such that a circular periphery of the rotating member 166 is closely fitted in the opening 168 in such a manner as to close the opening 168 and the rotating member 166 can rotate in this state. The first eccentric pin 167 is arranged to extend generally horizontally into the crank chamber 151 via the opening 168 and to face the underside of the flange 124*b* of the clutch member 124. Further, the numbers of teeth of the first, second, third and forth gears 161, 162, 164, 165 are determined such that the rotating member 166 rotates 360° when the mode switching member 155 is turned 360°.

Figure 2:
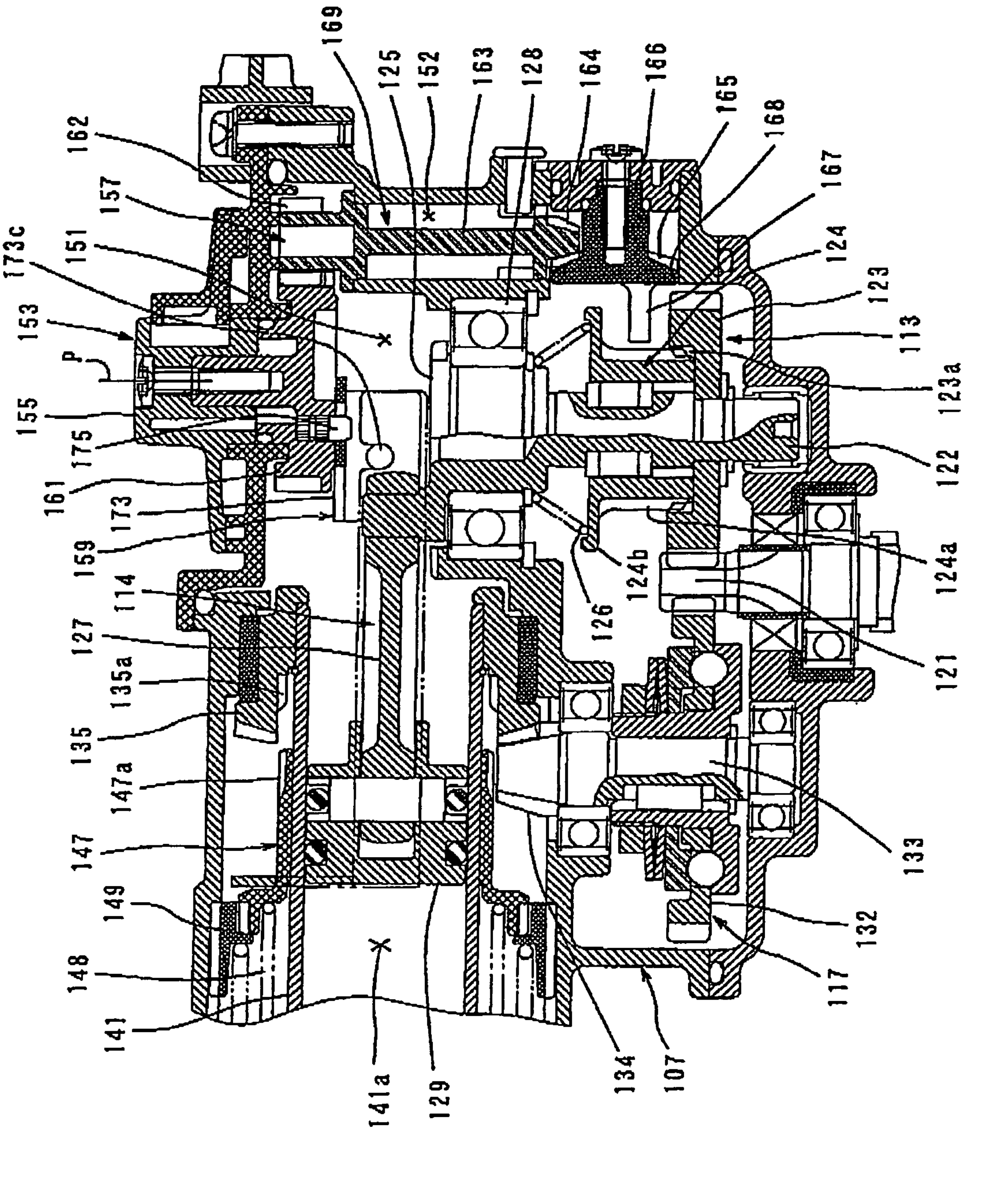
FIG. 2 is a sectional side view of an essential part of the hammer drill in hammer mode.
Figure 3:
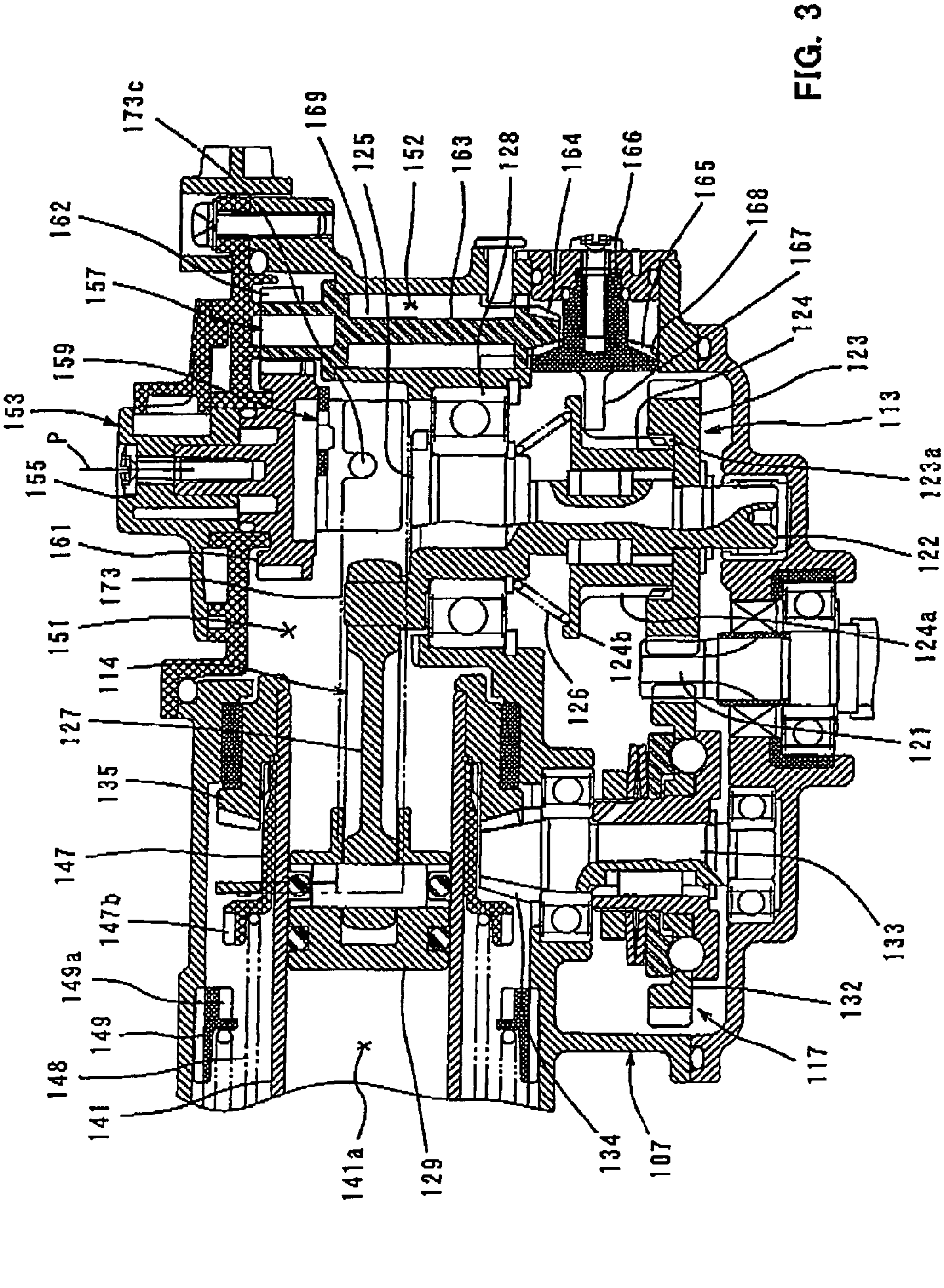
FIG. 3 is a sectional side view of the essential part of the hammer drill in hammer drill mode.
Figure 4:
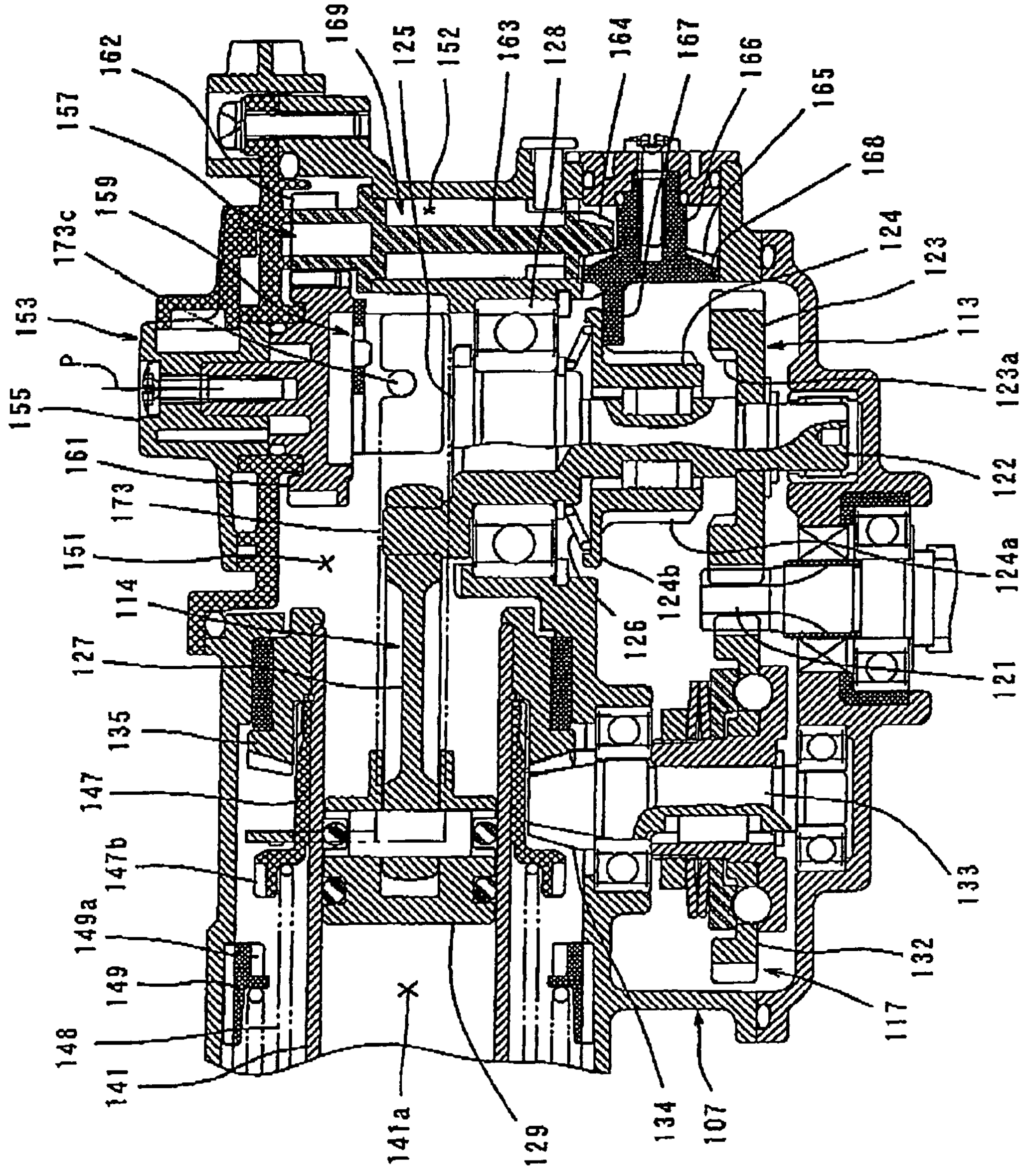
FIG. 4 is a sectional side view of the essential part of the hammer drill in drill mode.
Figure 5:
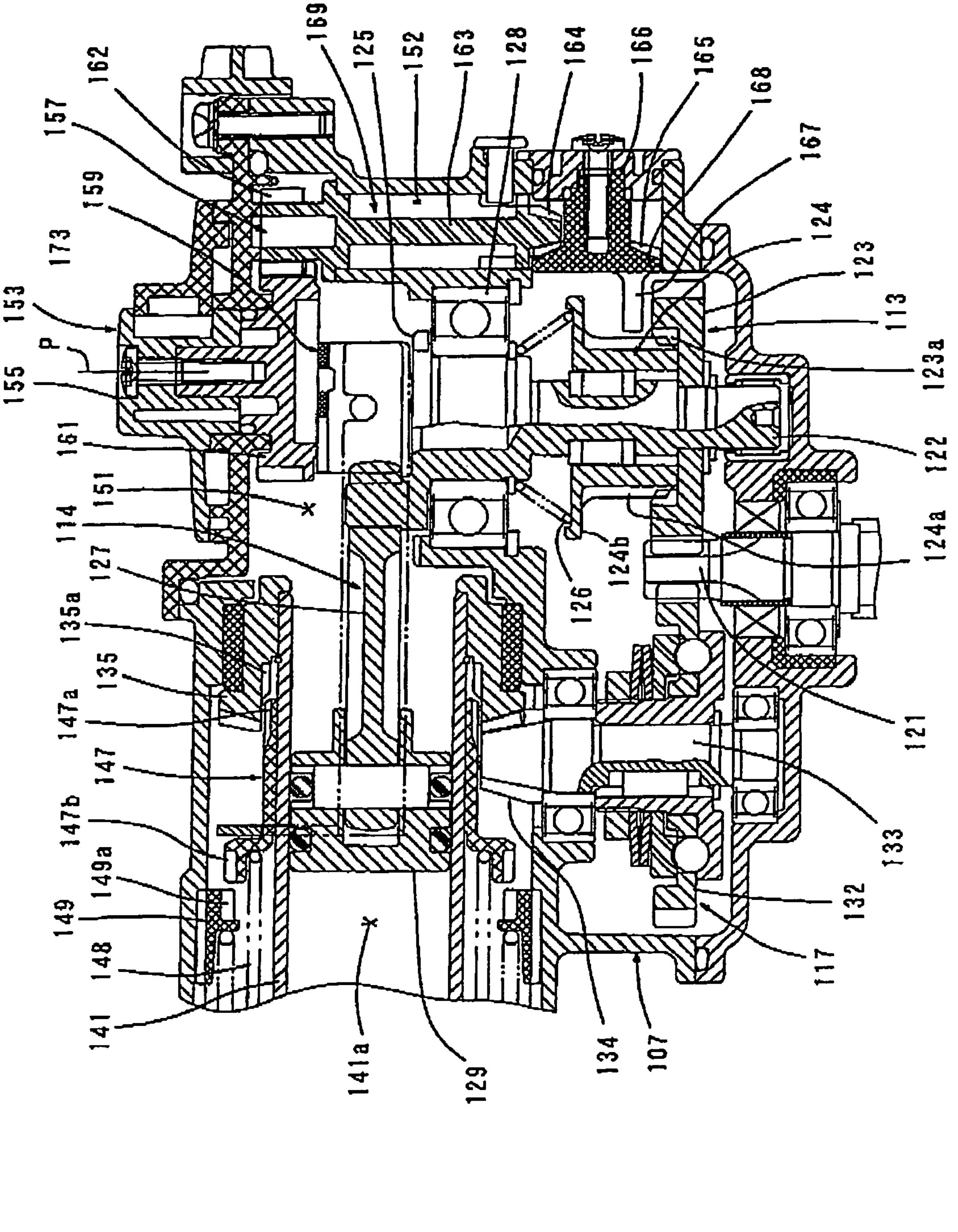
FIG. 5 is a sectional side view of the essential part of the hammer drill in neutral mode.

When the mode switching member 155 is turned to the hammer mode, the hammer drill mode or the neutral mode, as shown in FIG. 2, 3 or 5, the first eccentric pin 167 is moved to a position on the same level as or below the rotation axis of the rotating member 166 in the vertical direction. At this time, the clutch member 124 is moved downward by the biasing spring 126 and the clutch teeth 124*a* engage with the clutch teeth 123*a* of the driven gear 123. Thus, the clutch member 124 is switched to the power transmission state. On the other hand, when the mode switching member 155 is turned to the drill mode, as shown in FIG. 4, the first eccentric pin 167 is moved to a position higher than the rotation axis of the rotating member 166 in the vertical direction. At this time, the clutch member 124 is moved upward by the first eccentric pin 167 against the biasing force of the biasing spring 126 and thus the engagement between the teeth 124*a*, 123*a* is released. Specifically, the clutch member 124 is switched to the power transmission interrupted state.

Now, the second switching mechanism 159 is explained with reference to FIGS. 10 to 13. The second switching mechanism 159 is constructed such that switching of the slide sleeve 147 of the power transmitting mechanism 117 is effected by linear motion of a generally U-shaped frame member 173 in the longitudinal direction of the cylinder 141 when the mode switching member 155 is turned for mode change. The second switching mechanism 159 mainly includes a movable member or the frame member 173 that is generally U-shaped in plan view and disposed within the crank chamber 151. The frame member 173 is a feature that corresponds to the "second switching member" according to this invention.

As shown in FIGS. 10 to 13, the frame member 173 includes a base 173*a* which extends horizontally in a direction intersecting the longitudinal direction of the cylinder 141, and two legs 173*b* which extend horizontally in the longitudinal direction of the cylinder 141 through the space outside the large bevel gear 135. The base 173*a* has connecting pins 173*c* on the both ends in the extending direction, and the connecting pins 173*c* are engaged in recesses of the legs 173*b*. Thus, the base 173*a* and the legs 173*b* move together in the longitudinal direction of the cylinder 141. An oblong hole 173*d* is formed in the base 173*a* of the frame member 173 and engages with a second eccentric pin 175 (shown in cross section in FIGS. 10 to 13). The second eccentric pin 175 is provided on the underside of the first gear 161 of the first switching mechanism 157 and disposed in a position displaced a predetermined distance from the rotation axis of the first gear 161. Therefore, when the second eccentric pin 175 revolves on the rotation axis of the first gear 161, the second eccentric pin 175 moves the frame member 173 in the longitudinal direction of the cylinder 141 by its longitudinal components (components in the longitudinal direction of the cylinder 141) of the revolving movement.

Therefore, when the mode switching member 155 is turned, the frame member 173 is linearly moved in the longitudinal direction of the cylinder 141 by the second eccentric pin 175 engaged with the oblong hole 173*c*. The legs 173*b* extend through the region outside the large bevel gear 135, and ends of the legs 173*b* in the extending direction reach the outside of the slide sleeve 147. An engagement end 173*e* is formed on the end of each of the legs 173*b* in the extending direction and can engage with a stepped portion 147*c* of the slide sleeve 147 in the extending direction. The engagement end 173*e* is formed by bending the end of the leg 173*b* inward (toward the slide sleeve 147).

Figure 10:
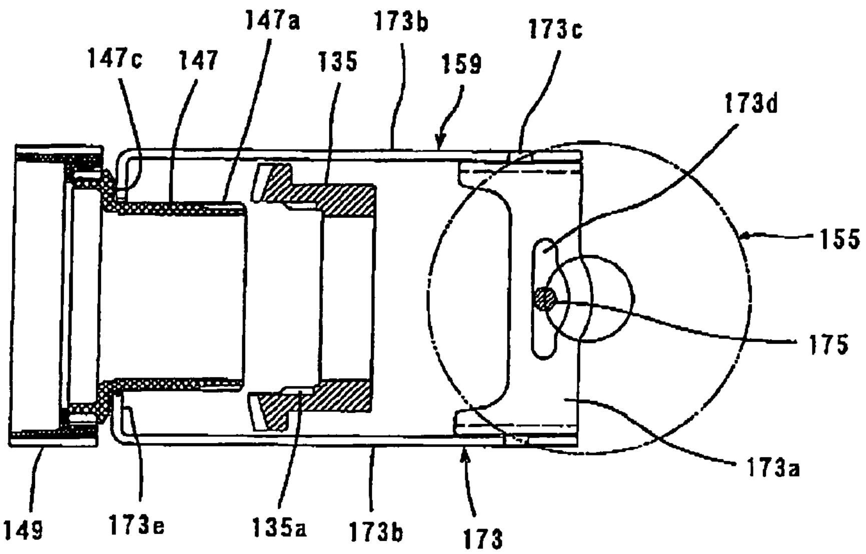
FIG. 10 is a sectional plan view showing a second switching mechanism in hammer mode.
Figure 13:
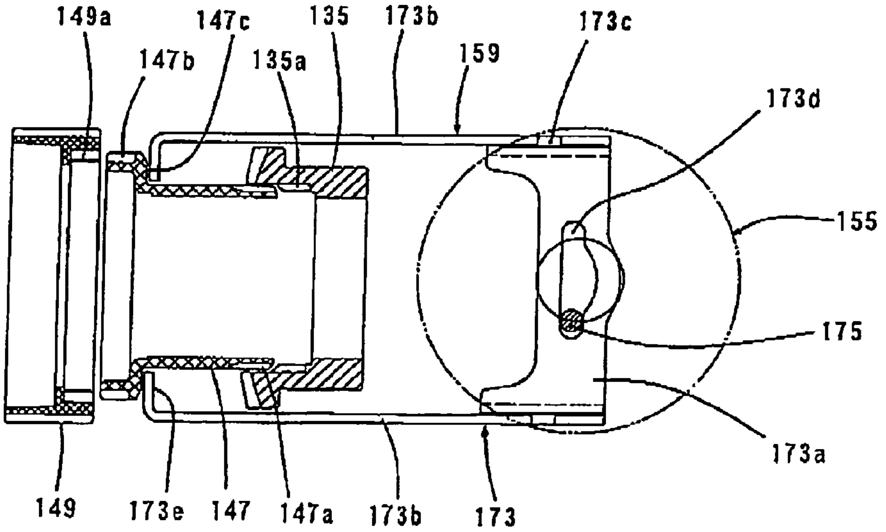
FIG. 13 is a sectional plan view showing the second switching mechanism in neutral mode.

When the mode switching member 155 is turned to the hammer mode or the neutral mode, as shown in FIGS. 2 and 10, or FIGS. 5 and 13, the frame member 173 is moved forward (leftward as viewed in the drawing) by the second eccentric pin 175 and pushes the stepped portion 147*c* of the slide sleeve 147 forward against the biasing spring 148 by the engagement ends 173*e* on the leg ends. As a result, the slide sleeve 147 is moved forward away from the large bevel gear 135, and the clutch teeth 147*a* of the slide sleeve 147 are disengaged from the clutch teeth 135*a* of the large bevel gear 135. Thus, the slide sleeve 147 is switched to the power transmission interrupted state. Further, as shown in FIGS. 5 and 13, in the state in which the mode switching member 155 is placed in the neutral mode, the rotation locking teeth 147*b* of the slide sleeve 147 do not engage with the teeth 149*a* of the lock ring 149. In other words, the slide sleeve 147 does not engage with either of the large bevel gear 135 and the lock ring 149. Therefore, the user can hold the hammer bit 119 and rotate it. Further, in the hammer mode position in which the slide sleeve 147 is placed further forward than in the neutral mode position, as shown in FIGS. 2 and 10, the instant when the slide sleeve 147 is placed in the power transmission interrupted state, the rotation locking teeth 147*b* of the slide sleeve 147 engage with the teeth 149*a* of the lock ring 149 and thus the slide sleeve 147 is locked against movement in the circumferential direction. Thus, "variolock" is effected.

When the mode switching member 155 is turned to the hammer drill mode position or the drill mode position, as shown in FIGS. 3 and 11, or FIGS. 4 and 12, the frame member 173 is moved rearward (rightward as viewed in the drawings) by the second eccentric pin 175, and the engagement ends 173*e* on the leg ends are disengaged from the stepped portion 147*c* of the slide sleeve 147. Then, the slide sleeve 147 is moved rearward toward the large bevel gear 135 by the biasing force of the biasing spring 148, and the clutch teeth 147*a* of the slide sleeve 147 engage with the clutch teeth 135*a* of the large bevel gear 135. Thus, the slide sleeve 147 is switched to the power transmission state.

Operation and usage of the hammer drill 101 constructed as described above is explained. When the user turns the mode switching member 155 about 120° clockwise or counterclockwise on the rotation axis P from the hammer drill mode position shown in FIG. 7 or the drill mode position shown in FIG. 8 to the hammer mode position shown in FIG. 6, in the first switching mechanism 157, the rotating member 166 is caused to rotate via the first and second gears 161, 162, the rotation transmitting shaft 163 and the third and fourth gears 164, 165. At this time, as shown in FIG. 2, the first eccentric pin 167 is caused to revolve downward about 120° on the rotation axis of the rotating member 166 from its position in the hammer drill mode or the drill mode and thus disengaged from the flange 124*b* of the clutch member 124. As a result, the clutch member 124 is moved downward toward the driven gear 123 by the biasing spring 126, and the clutch teeth 124*a* of the clutch member 124 engage with the clutch teeth 123*a* of the driven gear 123. Thus, the clutch member 124 is switched to the power transmission state.

Meanwhile, in the second switching mechanism 159, the second eccentric pin 175 is caused to revolve about 120° on the rotation axis of the first gear 161 from its position in the hammer drill mode or the drill mode and moves the frame member 173 forward (toward the hammer bit 115). At this time, as shown in FIGS. 2 and 10, the forward moving frame member 173 pushes the slide sleeve 147 forward by the engagement ends 173*e* of the legs 173*b*, and thus the clutch teeth 147*a* of the slide sleeve 147 are disengaged from the clutch teeth 135*a* of the large bevel gear 135. Thus, the slide sleeve 147 is switched to the power transmission interrupted state. Further, the rotation locking teeth 147*b* of the slide sleeve 147 engage with the teeth 149*a* of the lock ring 149 and thus the variolock is effected.

In order to drive the hammer bit 119 in the hammer mode, the hammer bit 119 is adjusted (positioned) to a predetermined orientation in the circumferential direction. This adjustment can be made in the state in which the mode switching member 155 is turned to the neutral mode position (shown in FIG. 9 (A) or (B)) that is placed in an intermediate position between the hammer mode position and the hammer drill mode position, or between the hammer mode position and the drill mode position. In this neutral mode position, as shown in FIG. 5, in the first switching mechanism 157, the first eccentric pin 167 is disengaged from the flange 124*b* of the clutch member 124. Therefore, the clutch teeth 124*a* of the clutch member 124 are held engaged with the clutch teeth 123*a* of the driven gear 123. Meanwhile, in the second switching mechanism 159, the clutch teeth 147*a* of the slide sleeve 147 are disengaged from the clutch teeth 135*a* of the large bevel gear 135, and the rotation locking teeth 147*b* of the slide sleeve 147 are held disengaged from the teeth 149*a* of the lock ring 149. In this neutral mode state, the tip end of the hammer bit 119 is adjusted in orientation in the circumferential direction. Thereafter, when the mode switching member 155 is turned to the hammer mode position, the rotation locking teeth 147*b* of the slide sleeve 147 are engaged with the teeth 149*a* of the lock ring 149. Thus, the above-mentioned "variolock" is effected and the hammering operation can be performed with the hammer bit 119 held in fixed orientation.

In this state in which the mode switching member 155 is in the hammer mode position, when the trigger 109*a* is depressed to drive the driving motor 111, the rotation of the driving motor 111 is converted into linear motion by the crank mechanism 114. The piston 129 then linearly slides along the cylinder 141. The striker 143 is caused to reciprocate within the cylinder 141 via the action of an air spring or pressure fluctuation of air within the air chamber 141*a* of the cylinder 141 which is caused by sliding movement of the piston 129. The striker 143 then collides with the impact bolt 145 and transmits the kinetic energy to the hammer bit 119. At this time, the slide sleeve 147 of the power transmitting mechanism 117 is in the power transmission interrupted state. Therefore, the hammer bit 119 does not rotate. Thus, in the hammer mode, a predetermined hammering operation can be performed solely by the striking movement (hammering movement) of the hammer bit 119.

Figure 11:
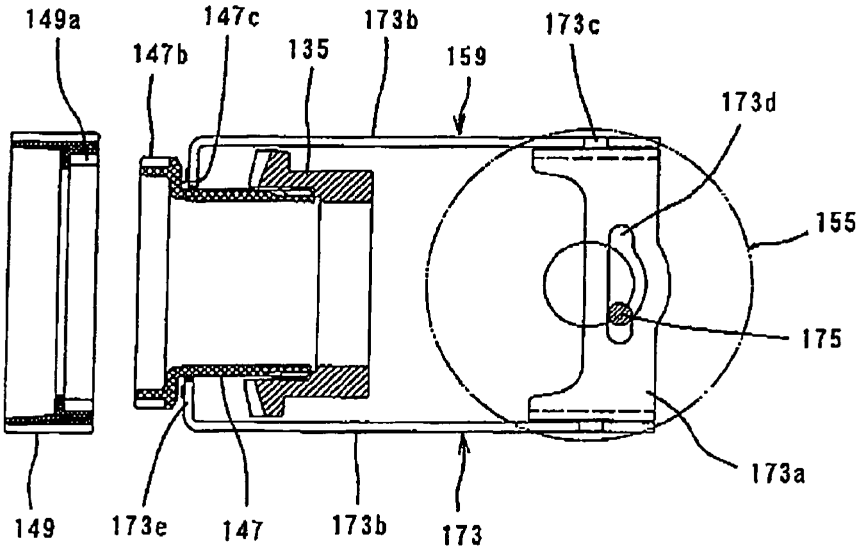
FIG. 11 is a sectional plan view showing the second switching mechanism in hammer drill mode.

Next, when the user turns the mode switching member 155 from the hammer mode position shown in FIG. 6 to the hammer drill mode position shown in FIG. 7, as shown in FIG. 3, the first eccentric pin 167 of the first switching mechanism 157 is caused to revolve about 120° on the rotation axis of the rotating member 166 from its position in the hammer mode, and comes close to the flange 124*b* of the clutch member 124. The first eccentric pin 167 only comes into contact with or faces the flange 124*b* with a slight clearance therebetween, and falls short of pushing up the flange 124*b*. Therefore, the clutch member 124 is held in the power transmission state. Meanwhile, the second eccentric pin 175 of the second switching mechanism 159 is caused to revolve about 120° on the rotation axis of the first gear 161 from its position in the hammer mode and moves the frame member 173 rearward as shown in FIG. 11. Thus, the engagement ends 173*e* of the frame member 173 are disengaged from the slide sleeve 147, and then the slide sleeve 147 is moved toward the large bevel gear 135 by the biasing force of the biasing spring 148. As a result, the clutch teeth 147*a* engage with the clutch teeth 135*a* of the large bevel gear 135. Thus, the slide sleeve 147 is switched to the power transmission state.

In this state, when the trigger 109*a* of the handgrip 109 is depressed to drive the driving motor 111, like in the hammer mode, the crank mechanism 114 is driven, and kinetic energy is transmitted to the hammer bit 119 via the striker 143 and the impact bolt 145 which form the striking element 115. Meanwhile, the rotating output of the driving motor 111 is transmitted as rotation to the cylinder 141 via the power transmitting mechanism 117 and further transmitted as rotation to the tool holder connected to the cylinder 141 and to the hammer bit 119 held by the tool holder in such a manner as to be locked against relative rotation. Specifically, in the hammer drill mode, the hammer bit 119 is driven in the combined movement of striking (hammering) and rotation (drilling), so that a predetermined hammer-drill operation can be performed on a workpiece.

Figure 12:
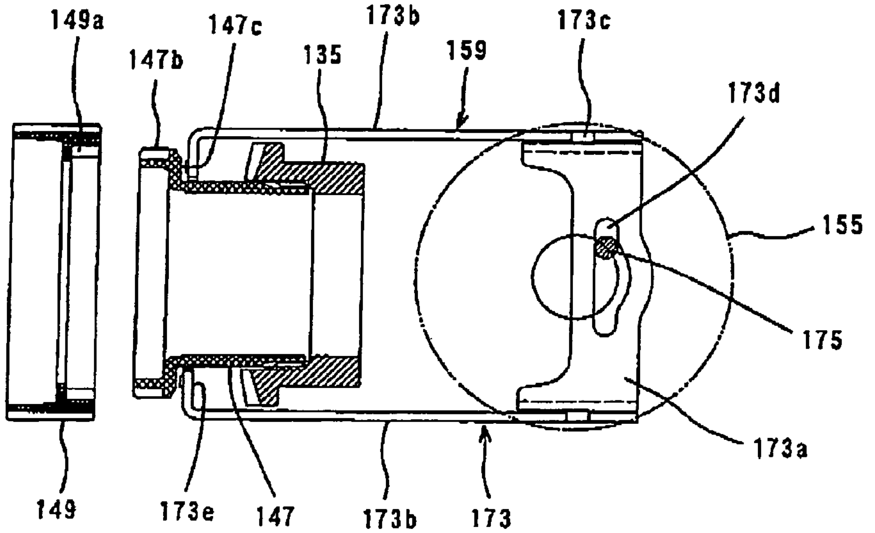
FIG. 12 is a sectional plan view showing the second switching mechanism in drill mode.

Next, when the mode switching member 155 is turned from the hammer drill mode position shown in FIG. 7 to the drill mode position shown in FIG. 8, as shown in FIG. 4, the first eccentric pin 167 of the first switching mechanism 157 is caused to revolve about 120° on the rotation axis of the rotating member 166 from its position in the hammer drill mode to the uppermost position in the vertical direction and pushes up the flange 124*b* of the clutch member 124. In other words, the clutch member 124 is moved upward away from the driven gear 123, so that the clutch teeth 124*a* of the clutch member 124 are disengaged from the clutch teeth 123*a* of the driven gear 123. Thus, the clutch member 124 is switched to the power transmission interrupted state. Meanwhile, the second eccentric pin 175 of the second switching mechanism 159 is caused to revolve about 120° on the rotation axis of the first gear 161 from its position in the hammer drill mode. At this time, as shown in FIG. 12, the second eccentric pin 175 moves through a circular arc region of the oblong hole 173*d* of the base 173*a* of the frame member 173, so that the longitudinal components of the revolving movement of the second eccentric pin 175 are not transmitted to the frame member 173. Therefore, the frame member 173 is held in the same position as in the hammer drill mode, and the slide sleeve 147 is held in the power transmission state.

In this state, even if the trigger 109*a* of the handgrip 109 is depressed to drive the driving motor 111, the clutch member 124 held in the power transmission interrupted state is not driven and the hammer bit 119 does not perform the striking movement. Meanwhile, in the power transmitting mechanism 117, the slide sleeve 147 is held in the power transmission state, so that the rotating output of the driving motor 111 is transmitted as rotation to the hammer bit 119. Specifically, in the drill mode, the hammer bit 119 is driven solely by rotation (drilling movement), so that a predetermined drilling operation can be performed on a workpiece.

In the driving mode switching mechanism 153 according to this embodiment, the first switching mechanism 157 switches the clutch member 124 of the crank mechanism 114 to the power transmission state or the power transmission interrupted state. When the mode switching member 155 is turned, the first switching mechanism 157 transmits rotation of the mode switching member 155 as eccentric revolution to the first eccentric pin 167 via the first, second, third and fourth gears 161, 162, 164, 165. Thus, the clutch member 124 is switched by vertical linear components of the eccentric revolution of the first eccentric pin 167. On the other hand, in the second switching mechanism 159 that switches the slide sleeve 147 of the power transmitting mechanism 117 to the power transmission state or the power transmission interrupted state, the second eccentric pin 175 in the mode switching member 155 moves the frame member 173 linearly in the longitudinal direction by horizontal (longitudinal) linear components of eccentric revolution of the second eccentric pin 175. In this manner, the slide sleeve 147 is switched. With this construction, mutual mechanical interference relating to the switching mechanism between the "clutch mechanism"

for striking movement of the hammer bit 119 and the "clutch mechanism" for rotation of the hammer bit 119 which may be caused when the mode switching member 155 is designed to be turned 360°, can be avoided.

According to this embodiment, the mode switching member 155 can be turned 360° on the rotation axis P in the both directions. Therefore, when the user changes the driving mode among the three modes, or the hammer mode, the drill mode and the hammer drill mode, the user can select a desired mode in the shortest distance by turning the mode switching member 155 to the desired mark 191*a*, 191*b* or 191*c* which indicates the driving mode. For example, by turning the mode switching member 155 clockwise in FIG. 7 in order to switch from the hammer drill mode to the hammer mode, or by turning the mode switching member 155 counterclockwise in FIG. 8 in order to switch from the drill mode to the hammer mode, the user can select the desired driving mode by the minimum amount of turn or in the shortest distance without passing through an unnecessary driving mode position. As a result, ease of operation in mode change can be enhanced.

In order to drive the hammer bit 119 in the hammer mode in which the hammer bit 119 is prevented from rotating in the circumferential direction, the hammer mode is selected after the orientation of the tip end of the hammer bit 119 is adjusted. Specifically, the user once turns the mode switching member 155 to the neutral mode and in this state adjusts the orientation of the tip end of the hammer bit 119. Thereafter, the user turns the mode switching member 155 from the neutral mode position to the hammer mode position. In this embodiment, the neutral mode positions are set between the hammer mode position and the hammer drill mode position, and between the hammer mode position and the drill mode position and marked with the marks 193*a*, 193*b*. Therefore, in the both cases of switching from the hammer drill mode to the hammer mode and switching from the drill mode to the hammer mode, the mode switching member 155 can be turned to the hammer mode position via the neutral mode position in the shortest distance. Specifically, the user can efficiently perform the mode switching action by the mode switching member 155.

Further, in this embodiment, the hammer mode position, the drill mode position and the hammer drill mode position to which the mode switching member 155 can be turned are set at even intervals or at 120° intervals in the circumferential direction of the rotation axis P of the mode switching member 155. As a result, in any of the cases of switching to any mode, the mode switching member 155 is turned by the same distance. Thus, the ease of use can be enhanced.

In this embodiment, the crank mechanism is used as a mechanism for converting the rotating output of the driving motor 111 to linear motion and driving the striker 143. However, a swinging mechanism may be used in place of the crank mechanism. The swinging mechanism may be formed by a swing plate that is tilted a predetermined angle with respect to the axis of a rotary shaft which is driven by the driving motor 111 and mounted to the rotary shaft in the tilted state. The swing plate swings in the axial direction of the rotary shaft by rotation of the rotary shaft.

DESCRIPTION OF NUMERALS

101 hammer drill
103 body
105 motor housing
107 gear housing
109 handgrip
109*a* trigger
111 driving motor
113 motion converting mechanism
114 crank mechanism
115 striking element
117 power transmitting mechanism
119 hammer bit (tool bit)
121 driving gear
122 crank shaft
123 driven gear
123*a* clutch teeth
124 clutch member
124*a* clutch teeth
124*b* flange
125 crank plate
126 biasing spring
127 crank arm
128 bearing
129 piston
132 intermediate gear
133 intermediate shaft
134 small bevel gear
135 large bevel gear
135*a* clutch teeth
141 cylinder
141*a* air chamber
143 striker
145 impact bolt
147 slide sleeve
147*a* clutch teeth
147*b* rotation locking teeth
147*c* stepped portion
148 biasing spring
149 lock ring
149*a* teeth
151 crank chamber
152 housing space
153 driving mode switching mechanism
155 mode switching member (operating part)
155*a* disc
155*b* operating grip
157 first switching mechanism
159 second switching mechanism
161 first gear
162 second gear
163 rotation transmitting shaft
164 third gear
165 fourth gear
166 rotating member
167 first eccentric pin (first switching member)
168 opening
169 switching operation transmitting mechanism
173 frame member (second switching member)
173*a* base
173*b* leg portion
173*c* connecting pin
173*d* oblong hole
173*e* engagement end portion
175 second eccentric pin
191*a*, 191*b*, 191*c* mark (shown by pictograph)
193*a*, 193*b* mark (shown by symbol)

What we claim is:

1. A hammer drill comprising:

a tool bit having a longitudinal axis;

a first driving mechanism part that linearly drives the tool bit along the longitudinal axis;

a first clutch mechanism disposed in the first driving mechanism part and switchable between a power transmission state of transmitting a driving force and a power transmission interrupted state of interrupting the transmission of the driving force;

a second driving mechanism part that rotationally drives the tool bit about the longitudinal axis;

a second clutch mechanism disposed in the second driving mechanism part and switchable between a power transmission state of transmitting a driving force and a power transmission interrupted state of interrupting the transmission of the driving force; and a driving mode switching mechanism that switches the driving mode of the tool bit among a hammer mode in which the tool bit is caused to perform striking movement along the longitudinal axis, a drill mode in which the tool bit is caused to perform rotation about the longitudinal axis and a hammer drill mode in which the tool bit is caused to perform striking movement and rotation, wherein the driving mode switching mechanism includes:

an operating part having a circumference, the operating part being turnable on a predetermined rotation axis by a user;

a first switching member, activated by turning the operating part, switches the state of the first clutch mechanism; and a second switching member, activated by turning the operating part, switches the state of the second clutch mechanism;

the operating part can be turned to at least three rotating positions around the circumference;

a first of the three rotating positions switches the first clutch mechanism to the power transmission state by activating the first switching member and switches the second clutch mechanism to the power transmission interrupted state by activating the second switching member, whereby the hammer mode is selected as the driving mode of the tool bit;

a second of the three rotating positions switches the first clutch mechanism to the power transmission interrupted state by activating the first switching member and switches the second clutch mechanism to the power transmission state by activating the second switching member, whereby the drill mode is selected as the driving mode of the tool bit; and a third of the three rotating positions switches the first clutch mechanism to the power transmission state by activating the first switching member and switches the second clutch mechanism to the power transmission state by activating the second switching member, whereby the hammer drill mode is selected as the driving mode of the tool bit; and the operating part can be turned 360° on the rotation axis in opposite directions.

2. The hammer drill as defined in claim 1, wherein:

the driving modes that can be selected by the user further include a neutral mode in which the user can manually rotate the tool bit;

fourth and fifth rotating positions for the neutral mode are set between the first and second rotating positions and between the first and third rotating positions; and the fourth or fifth rotating positions switch the second clutch mechanism to the power transmission interrupted state by activating the second switching member.

3. The hammer drill as defined in claim 1, wherein the first rotating position for the hammer mode, the second rotating position for the drill mode and the third rotating position for the hammer drill mode are set at even intervals about the circumference of the operating part.

4. The hammer drill as defined in claim 1, further comprising a rotating member that is rotated on a rotation axis different from the rotation axis of the operating part in synchronization with rotation of the operating part when the operating part is turned, wherein:

the first switching member comprises a first eccentric pin disposed in a position displaced from the rotation axis of the rotating member and switches the state of the first clutch mechanism by linear components of eccentric revolution on the rotation axis of the rotating member when the rotating member rotates, the operating part has a second eccentric pin disposed in a position displaced from the rotation axis of the operating part, and the second switching member comprises a movable member disposed to be linearly movable, and the movable member is caused to linearly move by linear components of the second eccentric pin, which eccentrically revolves on the rotation axis of the operating part and thereby switches the state of the second clutch member when the operating part is turned.

5. The hammer drill defined in claim 1, further comprising a tool body that houses the first driving mechanism part, the second driving mechanism part, the first clutch mechanism, and the second clutch mechanism, wherein the operating part is disposed on an upper surface of the tool body.

6. The hammer drill defined in claim 1, wherein the first rotating position of the operating part is placed in front of a path of rotation of the operating part about the longitudinal axis of the hammer drill, and the second or third rotating position is placed rearward of the first rotating position and selected by selectively turning the operating part clockwise or counterclockwise from the first rotating position.

* * * * *